Aug. 10, 1965 W. K. C. YUAN 3,200,204

RING COUNTER AND MARKER

Filed March 30, 1962

3 Sheets-Sheet 1

INVENTOR.
W.K.C. YUAN

BY

ATTORNEY

Aug. 10, 1965　　　　W. K. C. YUAN　　　　3,200,204

RING COUNTER AND MARKER

Filed March 30, 1962　　　　3 Sheets-Sheet 3

United States Patent Office 3,200,204
Patented Aug. 10, 1965

3,200,204

RING COUNTER AND MARKER

William K. C. Yuan, Bellwood, Ill., assignor to International Telephone and Telegraph Corporation, New York, N.Y., a corporation of Maryland Filed Mar. 30, 1962, Ser. No. 183,859
16 Claims. (Cl. 179—18)

This invention relates to ring counters and more particularly to ring counters especially—although not exclusively—adapted for use in telephone systems.

A "ring counter" is a circuit having many cascaded stages arranged in a ring or circle. That is, an output of each stage is connected to an input of the next succeeding stage in the circle. The operation of a ring counter is characterized by an endless, stage-by-stage (or step-by-step), transfer of a unique condition around the circle. Thus, at any given time, one stage stands in a unique condition and prepares the next succeding stage for operation. Upon receipt of an input signal at a common input terminal, the one stage loses its unique condition and the prepared stage gains the unique condition. Hence, each input signal causes the unique condition to transfer one stage or step around the circle endlessly.

Heretofore, each ring counter stage has included a multiple element circuit. For example, one circuit widely used as a counter stage (sometimes called an Eccles-Jordan multivibrator circuit) includes a minimum of two transistors, six resistors, four capacitors, and three sources of potential. Obviously, the cost per stage must be multiplied by the number of stages included in the counter. Hence, each component part eliminated from the counter stage circuit constitutes a substantial cost savings.

Another way to effect substantial cost savings is to use components of a type used elsewhere in related circuits, but of specific characteristics which preclude such use in related circuits. In greater detail, a co-pending application shows an "Electronic Switching Telephone System," S.N. 113,178, filed May 29, 1961, by D. F. Seemann and E. R. Haskins. That system includes a PNPN diode matrix for completing self-seeking paths between end-marked points. Obviously, the PNPN diodes used in that matrix must have some specified characteristics, and the diode manufacturer must manufacture within a set of tolerance limits. Therefore, in each harvest of diodes, there will almost certainly be some diodes which function well, but which fail to have the specified characteristics. Heretofore, the good diodes which merely failed to meet specifications have been destroyed or sold at a discount. The result was a higher price for the usable diodes which do meet specifications. Thus, there is a substantial cost savings if non-matrix circuits in the Seemann-Haskins system are designed to use the PNPN diodes which fail to meet the specified matrix diode characteristics.

The marker is one non-matrix circuit in the Seemann-Haskins system which is especially well suited for PNPN diode use. A "marker" is a device which provides a series of time frame pulses for enabling a switch path to be extended through a system. Since the marker is common to all switch paths, no calls can be completed through the system if the marker fails. Hence, it is obvious that the marker must be extremely reliable. If one reflects upon the paralysis of social and economic action that follows a general failure of a communication system, the truth of the statement about marker reliability becomes more apparent. Thus, the marker should be able to use components having widely varying characteristics and yet be fail-free under the most adverse operating conditions.

Accordingly, an object of this invention is to provide new and improved ring counters. A more specific object is to provide ring counters especially—although not exclusively—adapted for use in electronic telephone systems.

Another object is to provide simple, low cost, easily manufactured ring counters. Here, an object is to reduce the number of circuit elements required for each ring counter stage. In this connection, an object is to provide ring counters which use PNPN diodes that fail to meet the specifications of diodes used elsewhere in related circuits. Yet another object is to use these non-specification diodes without in any way sacrificing circuit reliability. Quite the contrary, an object is to provide circuits having the highest order of reliability.

Still another object is to provide marker circuits having great reliability. In this connection, an object is to provide a self-testing marker which continuously monitors its own output. Thus, an object is to provide a marker which switches to a standby unit if a failure is detected.

In accordance with one aspect of this invention, these and other objects are accomplished by ring counters comprising a plurality of stages having a common input and individual, isolated outputs. Each ring counter stage includes a voltage divider having a bistable electronic device (here a PNPN diode) in at least one arm. A capacitive coupling connects a potential point on the voltage divider of each counter stage to another potential point on the voltage divider in the next following stage, thus forming a closed circle of counter stages. At any given time, the bistable device in a first stage is in one stable state (e.g., "on") and the bistable devices in all other stages are in another stable state (e.g., "off"). Current flows through the bistable device that is in the one state to charge the capacitive coupling between the first stage and the next following stage to prime or prepare such following stage. When an input signal appears at the common input, all bistable devices are momentarily back biased and switched to the other stable state. After the back bias disappears, the primed bistable device in the prepared stage switches to its one stable state. Thus, its associated capacitor charges and prepares the next stage.

In carrying out the invention, a common source of pulses (a free running multivibrator, for example) drives three ring counters in synchronism. The output of a first ring counter provides marker pulses for a telephone system. The output of a second ring counter is inhibited. The output of the third ring counter is continuously compared with the outputs of the first and second ring counters. If a difference is detected between the outputs of the first and third ring counters, the output of the first is inhibited and the output of the second provides the marker pulses of the telephone system.

The above mentioned and other features of the invention and the manner of obtaining them will become more apparent, and the invention itself will be best understood by reference to the following description of an embodiment of the invention taken in conjunction with the accompanying drawings, in which:

FIG. 1 shows the logic symbols used elsewhere in the drawings;

FIGS. 2 and 3 combine logic and schematic circuitry to explain the principles of the invention;

FIG. 2*a* shows a high power ring counter stage which may be used in conjunction with the ring counter of FIG. 2;

Figure 3:
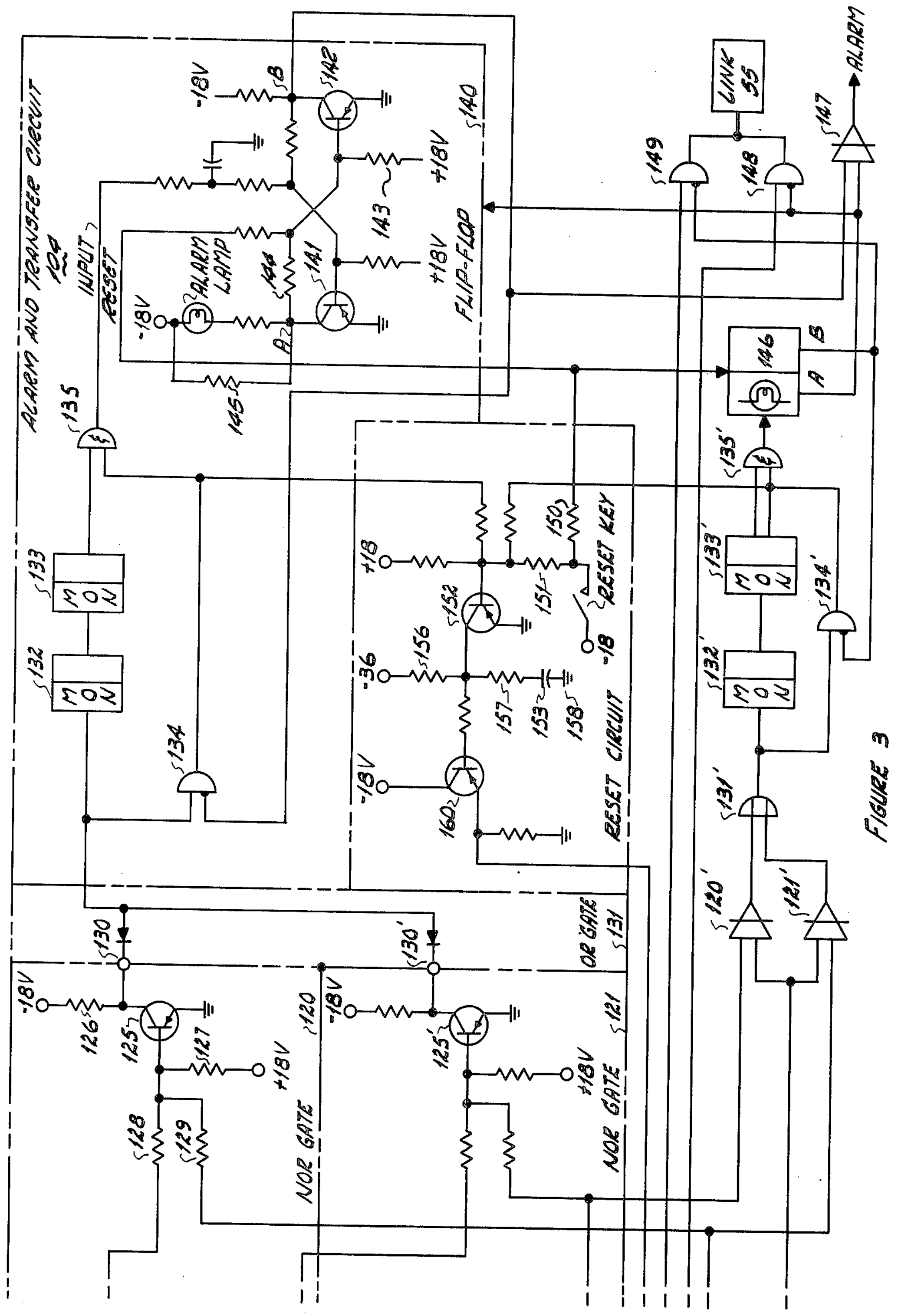

FIGS. *9a*, *9b* show an alternative embodiment of the invention for use in the circuit of FIG. 3.

Figure 1:
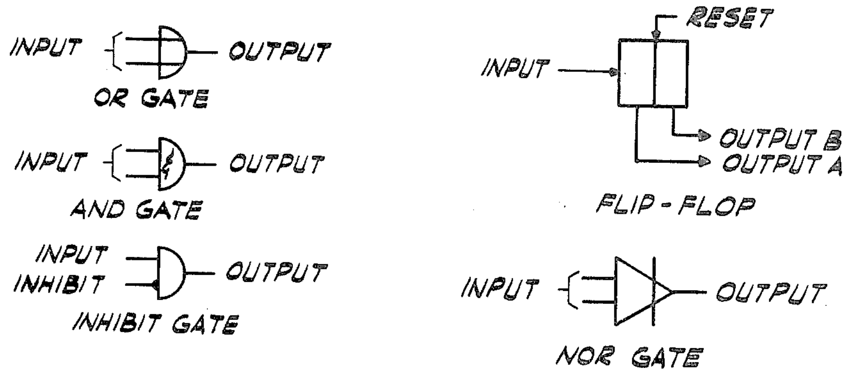

As shown in FIG. 1, an OR gate is shown by a semicircle having inputs which intersect the chord. If any "input" terminal is energized, the "output" terminal is also energized.

An AND gate is shown by a semicircle having inputs which touch the chord thereof. If all "input" terminals are energized simultaneously, there is an output.

An "inhibit" circuit is shown by a semicircle including a dotted and an undotted input. If the undotted input terminal is energized, a signal appears at the "output" terminal unless the dotted "inhibit" terminal is also energized. Then, no signal can appear at the output.

A "flip-flop" circuit is shown by a double rectangle. If the "reset" terminal is energized, the "output A" terminal is energized. If the "input" terminal is energized, the "output B" terminal is energized.

A NOR circuit is shown as a triangle having a bar at its apex. The NOR circuit energizes its "output" terminal at all times except when both "input" terminals are energized.

*Ring counter*

Figures 2, 2A:
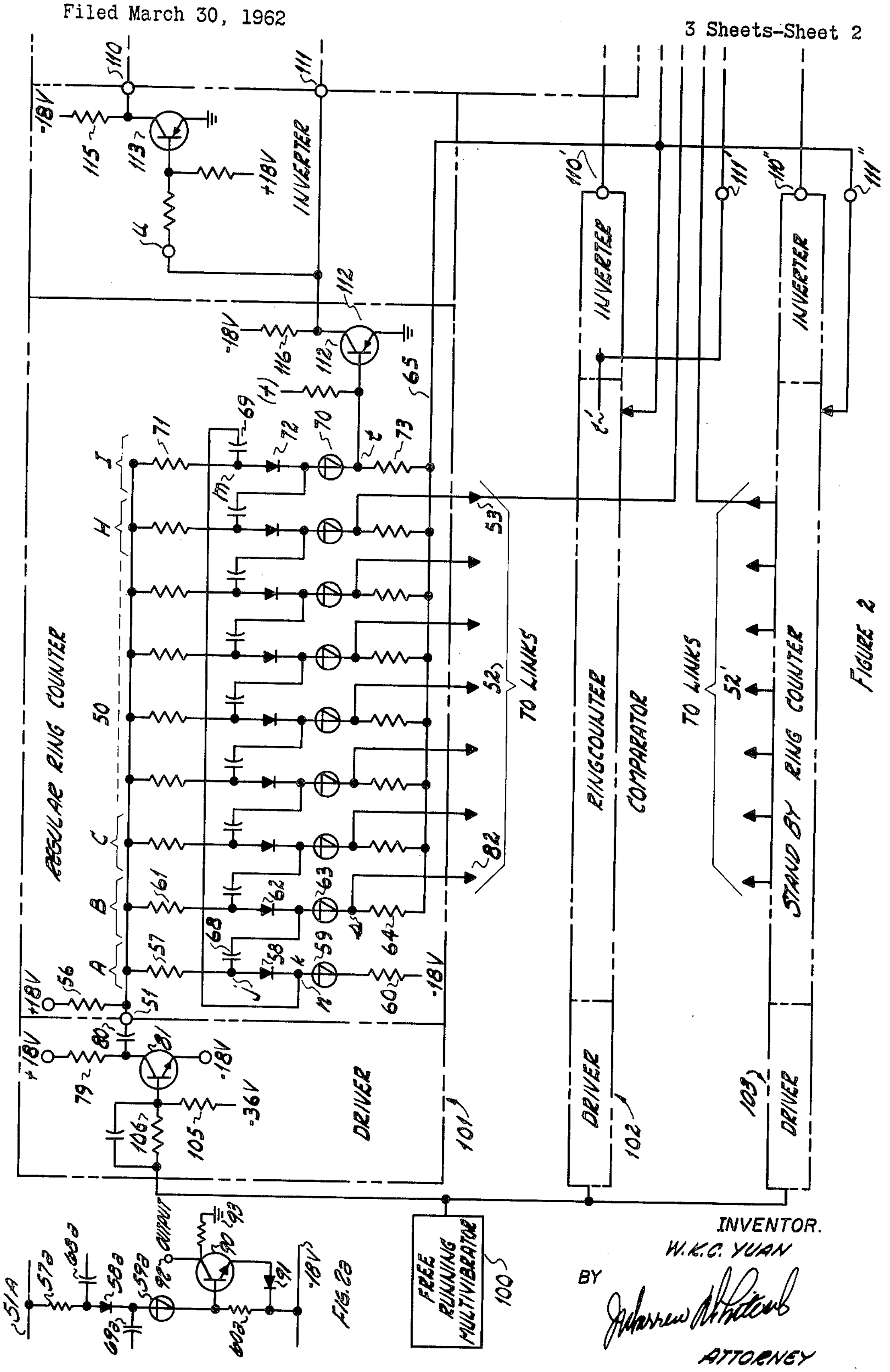

An exemplary ring counter circuit embodying the principles of the invention is shown at 50 in FIG. 2. This is a multi-stage PNPN diode circuit having an input 51 common to all stages and a plurality of isolated outputs 52. The voltage changes which appear at each of the outputs 52 are time frame pulses. Each output is individual to one ring counter stage; for example, the output 53 is individual to the stage H, and stage H individually identifies one of many links in a telephone system, link 55 for example. During each time frame while stage H conducts, the link 55 is enabled to extend a switch path through a telephone system.

Any suitable number of ring counter stages may be provided depending upon the number of links to be identified. Here, for example, nine stages (designated A–I) provide a start position (A); seven counting stages for identifying seven links (B–H); and a comparison position (I). In another embodiment, the stage outputs may be used in a different way; for example, all nine stages may be counting stages.

All ring counter stages are identical; each includes a voltage divider having a bistable electronic device in at least one arm thereof. Consider stage A, by way of example. The voltage divider may be traced from a +18 v. battery, through resistors 56, 57, diodes 58, PNPN diode 59, and resistor 60 to a −18 v. battery. Obviously, the word "battery" should be construed to include all suitable power sources. In stage A, the −18 v. battery is permanently connected to resistor 60. In all other stages (B–I), the −18 v. battery is removably connected via a common bus 65. Hence, the ring counter may be forced to start on stage A if the −18 v. battery is disconnected from bus 65. In other embodiments, any other stage or stages may be selected as a start position by an inclusion of similar −18 v. connections.

To arrange the counter stages in a ring or circle, a capacitive coupling connects a potential point in the voltage divider of each counter stage to another potential point in the voltage divider in the next following stage. That is, stage B is the stage next following stage A. In a similar manner, stages B–I follow each other in alphabetical order. Stage A is the stage next following stage I, thus completing the circle. By way of example, the capacitor 68 couples potential point *j* in stage A to potential point *k* in stage B, thus providing the interstage coupling between stages A and B. Similar capacitors couple stages B–I in alphabetical order, and capacitor 69 couples potential point *m* in stage I to potential point *n* in stage A, thus completing the ring or circle.

The easiest way to explain circuit operation is to assume specific voltages at specific points in the circuit. While efforts have been made to assume voltages which might reasonably be expected, the values are approximate and no special significance should be attached thereto. Also, all stages of the counter are the same; therefore, an assumption may be made that the PNPN diode in any one of them is conducting at any given time. Since the relation between stages I and A may be a little more difficult to visualize, an assumption is here made that PNPN diode 70 in stage I is conducting.

Current flows from the +18 v. battery through resistors 56, 71; diodes 72, 70; and resistor 73 to the −18 v. battery on bus 65. The IR voltage drop across resistor 56 causes +4 volts to appear at point 51, and the IR voltage drop across resistor 71 causes −6 volts to appear at point *m*. The PNPN diode 59 is "off" (as are all other PNPN diodes except 70), and no current flows through resistor 57 and diode 58 to cause any IR voltage drop, thus making point *n* the same voltage as point 51, i.e., +4 volts. With +4 volts at point *n* and −6 volts at point *m*, the charge on capacitor 69 is the difference, or 10 volts. The The +4 volts at point 51 and the +18 volt battery connected to resitor 79 make a 14 volt charge on capacitor 80.

Next, assume that an input signal appears on the base of transistor 81 which switches "on." The point 51 instantly drops from +4 volts to −28 volts (i.e., the sum of −18 volts on the emitter of transistor 81, the −14 volt charge on capacitor 80, and the +4 volts at point 51, assuming that the transistor is switched on infinitely fast). This −28 volts reverse biases all ring counter PNPN diodes (such as 70, for example) and any conducting PNPN diode switches "off." Since it was assumed that the diode 70 is the only PNPN diode that is "on" when the input signal appears, only it switches "off." Current now flows from the +18 volt battery through resistor 56, capacitor 80 and transistor 81 to the −18 volt battery at the emitter of transistor 81. As capacitor 80 charges (at a rate fixed by the resistor 56), point 51 moves toward the +18 volt potential applied to the upper end of resistor 56. As the potential at point 51 moves toward this +18 volts, it adds to the 10 volt charge on capacitor 69, and PNPN diode 59 switches "on."

Current now flows from the +18 volt battery through resistors 56, 57, diodes 58, 59, and resistor 60 to the −18 volt battery. The potential at point 51 goes to +4 volts when PNPN diode 59 switches "on." This prevents any other PNPN diode in the ring counter from switching "on." As the potential at point *j* goes to −6 volts and the potential at point *k* goes to +4 volts, the capacitor 68 charges to 10 volts.

The circuit remains in the described condition until the next input signal appears at the base of transistor 81 to switch it "on." Then, PNPN diode 59 switches "off," and PNPN diode 63 switches "on."

As long as the circuit remains energized, the ring counter continues to step one step for every input pulse. Each time that a PNPN diode conducts, an output pulse appears on one conductor in group 52. Thus, when PNPN diode 63 conducts, for example a pulse shown by one of the curves of FIG. 6 appears on an associated output conductor 82. The width of this pulse may vary somewhat depending upon the characteristics of the PNPN diodes.

Figures 4, 5, 6, 7, 9A, 9B:
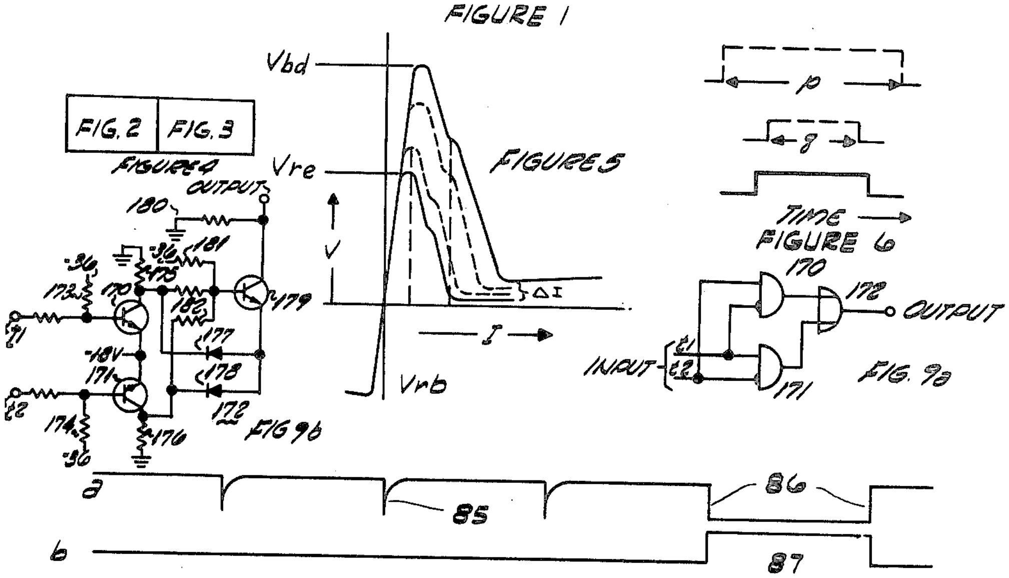
FIG. 4 shows how FIGS. 2 and 3 should be joined to provide a complete circuit.
FIG. 5 shows the characteristic curves of PNPN diodes on an axis with voltage plotted vertically and current plotted horizontally.
FIG. 6 shows allowable variations of an output pulse produced by the ring counter.
FIG. 7 shows the improved isolation of the ring counter output pulses.

The characteristics of a PNPN diode are shown in FIG. 5. When the diode is reverse biased, it is switched "off" (at a point V*rb*), very little current flows through it and there is a very high impedance between its two terminals. When a voltage is applied across the diode terminals, the diode continues to exhibit its high impedance until the applied voltage reaches a firing potential. Then the diode switches "on" and there is a very low impedance between the two terminals.

In PNPN diodes, the magnitude of the firing potential depends upon the rise time of the applied voltage and the characteristics of the individual diodes. If the voltage is applied with a very slow rise time, the diodes fire at a relatively high breakdown voltage V*bd*, where its semiconductor junction is forced to conduct in a reverse direction. If the voltage is applied with a very fast rise time, the diodes fire at a relatively low "rate effect" firing voltage V*re*. This is due to the internal capacitance characteristic of PNPN diodes. Probably no two diodes are identical. Therefore, as shown by dotted line curves in FIG. 5, the characteristics of the diodes spread out the firing voltages between the upper and lower limit voltages V*bd* and V*re*. Also, the diodes vary greatly in holding current characteristics as shown at ΔI in FIG. 5. This spread of diode characteristics both as to firing voltage and holding current limits the number of diodes, in any group of diodes, which may be used in the matrix of the Seemann-Haskins system. While that matrix can include diodes having extremely wide limits of firing characteristics, there must be some specified limits.

An advantage of the ring counter design is that it allows the use of PNPN diodes having varying holding current and firing characteristics. Thus, the ring counter can use the PNPN diodes which are manufactured to but fail to meet the matrix specifications. This is possible because the values of the components in the ring counter other than the PNPN diodes, may be selected to compensate for wide variations of diode characteristics. First, the applied potentials [e.g. +18 v. and −18 v.] and the resistor 56, 57 and 60 values [e.g., 1.5K, 820, and 1.2K respectively] are selected to allow for the effects of diode variations.

As will become more apparent from a study of the Seemann-Haskins application, the output pulses of the ring counter provide time frames for allowing paths to fire through a matrix. As shown herein by FIG. 6, these pulses are ideally the square pulse forms indicated by a solid line curve. However, if a PNPN diode fires fast and switches "off" slowly, the time frame spreads out and allows more than enough time *p* to fire the path through the matrix. This is not objectional because the Seemann-Haskins system allows an unused guard time between time frames. In fact, the guard space may be provided by controlling the time required for capacitor 80 to charge. Hence, within reasonable limits, the only effect of the increased spread of the output pulse of FIG. 6 is that the guard time between pulses is reduced. At the other extreme, a slow firing diode which turns "on" slowly and "off" quickly, reduces the pulse width as shown at *q*. (The relative values of *p* and *q* that are shown in the drawing have no significance.) Since the ideal, solid line wave form of FIG. 6 allows much more than enough time to fire a path through the Seemann-Haskins matrix, the pulse width may shrink drastically before the systems fail.

Additionally, the circuit values may be selected to provide the required holding current. Thus, the current is more than enough required to cover the entire range ΔI.

Thus, it is seen that the ring counter diode characteristics may have extremely wide variations, thereby reducing the total cost of all diodes used in the system. If, by way of example, the number of ring counter PNPN diodes is 25% of the total number of PNPN diodes required by the entire telephone system, the manufacture tolerance of PNPN diodes may be relaxed greatly to allow a substantial cost savings.

Means are provided for isolating the ring counter output pulses from circuit transients. That is, PNPN diode ring counters used heretofore have provided their output at the potential points above the PNPN diode, at point *j* for example. As shown in FIG. 7*a* this caused a series of spike pulses to occur at every output terminal as capacitor 80 charges and discharges. That is, when an input signal occurs and the voltage at point 51 goes from +4 volts to −28 volts, as explained above, the voltage at point *j* and all similar points in every other counter stage also goes to −28 volts, switching off all the counter stages. As the capacitor 80 charges the voltage at point *j* and similar points rises toward +18 volts, but before reaching +18 volts, the next succeeding stage of the counter is switched "on." This makes a spike pulse at the point *j*, as shown at 85 in FIG. 7. While the diode 59, for example, is "on" the voltage at point *j* is fixed by the IR drop across the entire voltage divider to give the square pulse shown at 86 (FIG. 7).

According to the invention, the counter stage output is taken from a point (such as *s*) below (with reference to the input point 51) the PNPN diodes so that when "off," the PNPN diode isolates its associated output from the undesirable transients. This means that the square pulses 87 occur without the intervening spike pulses 85.

To increase the output power of a ring counter stage, a PNPN diode controlled electronic switch is added to each ring counter stage. More particularly, as shown in FIG. 2*a*, an alternative embodiment of a ring counter stage provides all of the components described above. To orient the reader, all corresponding components in stage A (FIG. 2) and in FIG. 2*a* bear the same reference numeral, except that the letter *a* has been added as a suffix in FIG. 2*a*. In addition, the alternative embodiment in FIG. 2*a* includes a diode 91 and a switch 90 (here shown as an NPN junction type transistor).

Basically, the embodiment of FIG. 2*a* operates in the above described manner. However, the circuit values are selected so that the transistor 90 switches "off" and "on" as the PNPN diode switches "off" and "on." To understand this, consider first the "off" state. A small leakage current flows from point 51A and from ground 93 to the −18 volt bus. The currents will divide in some manner between resistor 60*a* and the diode 91. The way that they divide is not important. The most important point is that the resulting IR voltage drop across diode 91 is greater than the drop across resistor 60*a*. The result is that the transistor 90 emitter is made positive relative to the base and transistor 90 is biased "off."

Next, consider the "on" state. The PNPN diode 59*a* switches "on" and draws current through the resistor 60*a*. When the current goes up, there is a relatively large IR drop across the resistor 60*a* which makes the base of transistor 90 positive relative to the emitter. The transistor 90 switches "on" and draws current through its base-emitter junction. This in turn, draws a large current from ground 93 through transistor 90 and diode 91 to the −18 volt bus. The result is a current multiplied by the transistor gain. Hence, the output power of the ring counter is greatly increased.

*Marker*

FIGS. 2 and 3 show three, self-checking, ring counter channels and the associated circuitry required to form a marker circuit capable of controlling a telephone system. The major circuit assemblies of the marker comprise: a common source of clock pulses (which may be a free running multivibrator 100, for example); three ring counter channels 101, 102, 103, connected to be synchronously driven from the pulse source 100; and an alarm and transfer circuit 104.

The multivibrator 100 may have any convenient characteristics; in fact, it could be replaced by 110 volt, 60 c.p.s. commercial power.

The three ring counter channels 101–103 are identical. Each includes a driver stage, a ring counter, and an inverter. The driver includes an electronic switch, here shown as the transistor 81, for applying a control voltage to the capacitor 80. The resistor 105 and associated −36 v. battery provides the transistor 81 with a base bias voltage. The resistor 79 is a collector load resistor, and the resistor-capacitor circuit 106 controls the turn "on" time of transistor 81. In order to have a large negative voltage at point 51 to turn off all the counter stages before the counter is stepped to the next succeeding stage, transistor 81 must be switched on fast so that the −18 volts plus the charge on the capacitance 80 is reflected to points 51. Capacitance 106 is used to speed up the transistor turn "on" time.

The comparison (stage I) of each ring counter channel drives an inverter stage having two output terminals shown at 110, 111. The polarity of a voltage at one inverter output terminal is always the inverse of the polarity at the other output terminal. More particularly, when the PNPN diode 70 is "on," point *t* is at a −6 volt potential; when it is "off," point *t* is at a −18 volt potential. The transistor 112 is adapted to switch "on" when the PNPN diode is "off" and −18 volts appears at point *t*, and to switch "off" when the PNPN diode is "on" and −6 volts appear at point *t*. When transistor 112 is "on" its emitter ground appears at output terminal 111 and at point *u*. Transistor 113 is switched "off" and the −18 volts applied through resistor 115 appears at output terminal 110. When transistor 112 is "off" the −18 volts applied through resistor 116 appears at output terminal 111 and at point *u*. The base of transistor 113 goes negative relative to its emitter; therefore, it switches "on" and its emitter ground appears at output terminal 110. The point is that the polarity of the potential at output 110 is always opposite to the polarity of the potential at output 111.

Since all three ring counter channels 101, 102, 103 are driven in synchronism, the outputs 110, 110′, 110″ are always at the same instantaneous polarity and the outputs 111, 111′, 111″ are always at the same instantaneous, but opposite, polarity.

Means are provided for detecting faulty ring counter channel output conditions by continuously comparing the output of two of the ring counter channels 101, 103 with the output of a third standard or comparator ring counter channel 102. The comparison is accomplished at a pair of NOR gates 120, 121 for channel 101 and at similar pair of NOR gates 120′, 121′ for channel 103.

As shown at 120, a NOR gate includes a transistor 125 having a load resistor 126, a base bias resistor 127 and a pair of input or control resistors 128, 129. Under normal operating conditions, the transistor 125 always is "on" because if the three ring counters remain in synchronism, either terminal 110 or terminal 111′ is always negative; hence, the base of transistor 125 is always negative with respect to its emitter. Thus, the transistor remains "on" to apply its emitter ground potential to output terminal 130. In like manner, transistor 125′ remains "on" to apply its emitter ground potential to point 130′.

If channels 101 and 102 lose synchronism, the PNPN diode in the comparison stage I of one channel fires at a time when the PNPN diode in comparison stage I of the other channel does not fire. This means that channel 101, output terminal 110, for example, remains at ground potential when channel 102 output terminal 111′ also goes to ground potential. The transistor 125 then switches "off" because the potential on its base goes to the +18 volts applied through resistor 127. Hence, the potential at the NOR gate 120 output terminal 130 goes from the transistor 125 emitter ground potential to the −18 volt battery potential applied through resistor 126. The OR gate 131 conducts (as shown at *y* in FIG. 8) and triggers a monostable multivibrator 132. In like manner, transistor 125′ applies a −18 volts battery potential to point 130′.

Figure 8:
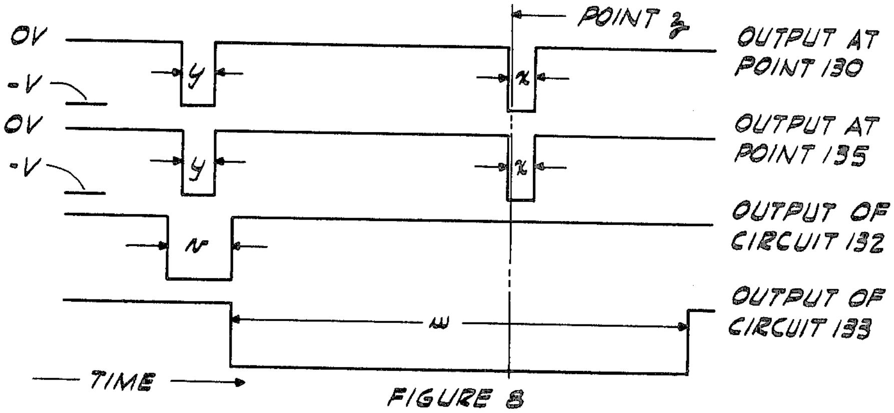
FIG. 8 shows a timing chart for explaining an alarm and transfer function.

For a measured period of time the monostable multivibrator 132 conducts, as shown at *v* in FIG. 8. After this measured period of time which is long enough to allow any transients to subside and counters to reset, multivibrator 132 automatically switches "off," and in doing so, triggers another monostable multivibrator 133. The monostable multivibrator 133 conducts during an extended time period *w* which is long enough to allow a second error signal to occur if either channel 101 or channel 102 is truly faulty. If so, an AND function is completed at a time designated "point *z*" in FIG. 8 to cause a transfer and alarm function. The transfer places the standby ring counter channel 103 in service and the alarm calls for maintenance. That is, each time that an error causes the transistors 125, 125′ to switch "off," the voltage at terminals 130, 130′ goes from a ground potential to a −18 volt potential. When this happens, the inhibit gate 134 conducts. During time period *v*, there is no effect because AND gate 135 is not energized at its upper input. After the monostable multivibrator 132 has timed out and monostable multivibrator 133 has switched "on," an error causes a voltage which again triggers multivibrator 132 and passes through gate 134. This time, there is coincidence at AND gate 135 which conducts and pulses the INPUT of the flip-flop 140.

Means are provided for transferring the marker output from the faulty regular ring counter channel 101 to a standby ring counter channel 103 responsive to the detection of a faulty condition. More particularly, the flip-flop 140, transistor 142 is normally "on" because it was originally set or reset to an "on" condition to apply its emitter ground to the output terminal B of the flip-flop. The transistor 142 is now held "on" because its base is made negative relative to its emitter by a potential on the voltage divider 143, 144, 145. When the AND gate 135 conducts, a voltage appears on its "output" conductor which makes the base of transistor 142 positive relative to its emitter. Transistor 142 switches "off," point B goes to the potential applied from the −18 volts battery through the collector resistor. This makes the base of transistor 141 negative relative to its emitter, and it switches "on." When output B goes to the emitter ground potential of transistor 142, gate 134 is inhibited to prevent it from conducting during any future error signals. Thus, AND gate 135 cannot again conduct and flip-flop 140 cannot again be triggered.

When point A of flip-flop 140 goes to ground, a signal appears on the RESET lead to the flip-flop 146 to switch its output from its conductor A to its conductor B. Both inputs to NOR gate 147 are de-energized, and it switches "on" to give an alarm which preferably locks "on" until reset manually. Before flip-flop 146 operates, its A side output inhibited gate 148 to prevent response to the output of the ring counter channel 103. There was no B side output so that the link 55 logic responded to the output of the ring counter channel 101 fed through gate 149. After the flip-flop 146 operates, its A side output disappeared so that the link 55 logic responds to the output of the ring counter channel 103. Now the B side output of flip-flop 146 inhibits the gate 149 to prevent response to the output of the ring counter channel 101.

Means are provided for simultaneously resetting the three ring counters when an error is detected. In greater detail, returning to the point in this description when the negative battery potential was applied through resistors 151 to the base of transistor 152; it conducts. Capacitor 153 is charged over the circuit extending from a −36 volt battery through resistors 156, 157 and capacitor 153 to ground 158. After transistor 152 conducts, its emitter ground potential is substituted for the −36 volt battery. Capacitor 153 discharges. During the time period required to discharge capacitor 153, normally "on" transistor 160 is held "off." This removes the −18 volt battery potential on the collector of transistor 160 from the bus 65. Obviously the only PNPN diodes which can fire in any of the channels are the ones in stages A which have a −18 volt potential. This means that after transistor 160 switches back "on," all ring counters are again synchronized. Thus, a future error signal is avoided if the only fault was a loss of synchronism between the ring counter channels.

The needs of any given system dictates the events which occur if an error is detected in the standby channel 103. For example, experience may show that a second error indicates that comparator channel 102—not standby channel 103—is faulty. If this is true, it would be better to leave control in the standby ring counter channel 103 than to retransfer back to the regular ring counter 101. On the other hand, experience may show that it is better to transfer between channels 101, 102 on each detection of an error. Thus, the system will continue to function at least to a degree if any capability remains in any marker channel.

Assuming that retransfer is desirable, when a second error signal appears, the circuits 131′–135′ function in the manner of circuits 131–135 described above. Flip-flops 140, 146 reverse their previously described states and the output of channel 101 is fed through inhibit gate 149 while the output of channel 103 is inhibited at gate 148. The transfer process continues as long as the error signals persist. Assuming that retransfer is not desirable, it is only necessary to eliminate those portions of circuits 131′–135′ which would cause retransfer. Instead, retransfer would occur when a maintenance man answers the alarm and performs suitable manual control functions.

FIG. 9 shows an alternative embodiment for some of the logic of FIGS. 2 and 3. To use the FIG. 9 embodiment, it is only necessary to remove everything in FIGS. 2 and 3 between points *t*, *t′* (channels 101 and 102) and the input of multivibrator 132 and gate 134. Instead, point *t1* of FIG. 9 is connected to point *t* of channel 101, point *t2* is connected to *t′* in channel 102, and the output of FIG. 9 is connected to the input of multivibrator 132 and gate 134.

The logic of this alternative embodiment is explained by FIG. 9*a*. When the stages I are "on" in both of the channels 101 and 102, each energizes an inhibit input to the gates 170, 171. When both of the stages I are "off" neither input is energized. If either stage I is "on" when the other is "off," one of the gates 170, 171 is not inhibited when energized at its input "*t*" terminal. Thus, the "OR" gate 172 conducts and energizes, the input to inhibit gate 134 and monostable multivibrator 132.

The circuit that provides this logic is shown in FIG. 9*b*. It includes a pair of NPN transistors having a pair of base bias resistors 173, 174. The collector loads are resistors 175, 176. The OR circuit 172 includes an NPN transistor 179 having a pair of emitter diodes 177, 178 which block ground, but allow negative battery to reach the emitter. The base bias for transistor 179 is taken from a pair of voltage dividers, one of which may be traced from a −36 volt battery through resistors 181, 182 and 176 to ground when transistor 171 is "off". When it is "on" the voltage divider may be traced from the −36 volt battery through resistors 181, 182 and transistor 171 to a −18 volt battery. When the PNPN diodes in stages I of both channels 101 and 102 are "off," −18 volts appear at terminals *t1*, *t2*. The emitters of transistors 170–171 are positive with respect to their bases and both are "off." The ground connected to resistors 175, 176 is blocked by diodes 177, 178 and emitter of transistor 179 is not energized. Thus, transistor 179 is "off" and the OUTPUT is at the ground potential 180.

If both terminals *t1*, *t2* go positive at the same time, both transistors 170, 171 turn "on" and the −18 volt emitter battery is applied through diodes 177, 178 to the emitter of transistor 179. But, the −18 volt potential masks the ground potential connected to resistors 175, 176. Thus, the base of transistor 179 remains negative with respect to the emitter, and transistor 179 is held "off." The OUTPUT terminal remains at the potential of ground 180.

On fault conditions, the terminal *t1* goes to ground while terminal *t2* remains at −18 volts (or vice versa). The base of transistor 170 goes positive with respect to its emitter while the base of transistor 171 remains negative with respect to its emitter. Thus, transistor 170 switches "on" while transistor 171 is held "off." When transistor 170 switches "on," its emitter −18 volt potential is applied through diode 177 to the emitter of transistor 179. Simultaneously, since transistor 171 is "off," the base of transistor 179 is made positive relative to the emitter. This positive potential is taken from the voltage divider extending from −36 volts through resistors 181, 182 and 176 to ground. When transistor 179 switches "on," its −18 volt emitter potential (applied via transistor 170 and diode 177) appears at the OUTPUT terminal in lieu of ground 180. Responsive thereto, monostable multivibrator 132 switches "on" and gate 134 conducts with the above described results.

From the foregoing, it will be apparent that applicant has provided new and improved ring counters which are especially—although not exclusively—adapted for use in telephone systems. Moreover, the total ring counter cost is greatly reduced because fewer parts are required for each stage. Also, system costs are reduced because the ring counters can make good use of diodes which fail to meet matrix and other system specifications. Finally, the redundancy, continuous comparison, and automatic transfer and alarm provides an extremely reliable unit.

While the principles of the invention have been described above in connection with specific apparatus and application, it is to be understood that this description is made only by way of example, and not as a limitation on the scope of the invention.

I claim:

1. A ring counter comprising a plurality of stages having a common input and individual isolated outputs, each of said stages comprising a voltage divider having the series combination of a first resistor, a diode, a PNPN diode and a second resistor, means for coupling a potential point comprising the junction between said first resistor and said diode on the voltage divider of each of said stages to another potential point comprising the junction between said diode and one side of said PNPN diode on the voltage divider on the next following stage, said coupling providing a path whereby, when in an "on" state, any of said PNPN diodes primes the PNPN diode in the next following stage, said common input being connected to said voltage dividers on said one side of said PNPN diodes and said first resistor, and means for taking the ring counter output from between said PNPN diodes and said second resistor.

2. The ring counter of claim 1 and means connected between each of said PNPN diodes and said ring counter output for increasing the output power of said ring counter stage.

3. The ring counter of claim 2 wherein said power increase means comprises a load resistor, an electronic switch, and a biasing diode, the circuit values being such that the IR drop across said load resistor is less than the IR drop across said biasing diode when the associated PNPN diode is "off" and greater than IR drop across said biasing diode when said PNPN diode is "on," and means responsive to the change of said IR drop relations for switching said electronic switches "off" and "on."

4. The ring counter of claim 1 and a comparator ring counter, means for comparing the outputs of said ring counter and said comparator ring counter for continuously monitoring the output of said ring counter, and means responsive to the detection of an error in said output for resetting said ring counter.

5. A ring counter channel comprising a driver stage, a ring counter stage and an inverter stage, said ring counter comprising a plurality of voltage dividers, each having a PNPN device in at least one arm thereof, means including said driver stage for providing a common input potential on one of each of said voltage dividers, means for providing individual isolated outputs from the other arm of each of said voltage dividers, whereby said PNPN devices isolates the ring counter output from said transients, means comprising a comparator having an output which duplicates the output of said ring counter, means comprising at least one of said voltage dividers for driving said inverter to supply first coincidence function, means responsive to the output of said comparator for supplying a second conicidence function, whereby said first and second functions do not coincide during normal non-faulty circuit operations, and means responsive to a coincidence of said first and second functions for giving a fault indication.

6. The ring counter of claim 5 and means connected between each of said PNPN diodes and said ring counter output for increasing the output power of said ring counter stage.

7. The ring counter of claim 6 wherein said power increase means comprises a load resistor, an electronic switch, and a biasing diode, the circuit values being such that the IR drop across said load resistor is less than the IR drop across said biasing diode when the associated PNPN diode is "off" and greater than IR drop across said biasing diode when said PNPN diode is "on," and means responsive to the change of said IR drop relations for switching said electronic switches "off" and "on."

8. A self-checking multi-ring counter circuit comprising three ring counter channels, means including a common source of clock pulses for synchronously driving said three channels, each of said channels including a plural stage ring counter having a common input and individual isolated outputs, each of the stages of said counters comprising a voltage divider having the series combination of a first resistor, a diode, a PNPN diode and a second resistor, means for capacitively coupling a potetntial point comprising the junction between said first resistor and said diode on the voltage divider of each stage to another potential point comprising the junction between said diode and one side of said PNPN diode on the voltage divider on the next following stage, said coupling providing a path whereby any one of said PNPN diodes in one stable state primes the PNPN diode in the next following stage, said input being connected to said voltage divider on one side of said PNPN diodes and said isolated outputs being taken from the other side of said diodes, thus isolating the ring counter output from circuit transients when said diodes are "off," means for normally enabling the output of a first of said channels and inhibiting the output of a second of said channels, means for continuously comparing the outputs of said first and second channel with the output of a third of said channels, means responsive to the detection of a difference by said comparing means for enabling the output of said second channel and inhibiting the output of said one channel.

9. The ring counter of claim 8 and means connected between each of said PNPN diodes and said ring counter output for increasing the output power of said ring counter stage.

10. The ring counter of claim 9 wherein said power increase means comprises a load resistor, an electronic switch, and a biasing diode, the circuit values being such that the IR drop across said load resistor is less than the IR drop across said biasing diode when the associated PNPN diode is "off" and greater than the IR drop across and biasing diode when said PNPN diode is "on," and means responsive to the change of said IR drop relations for switching said electronic switches "off" and "on."

11. In a electronic switching telephone system, the combination comprising a plurality of links responsive to time frame pulses for individually enabling a link to extend a switch path through said system, means for providing said time frame pulses comprising at least one ring counter having a plurality of stages with a common input and individual isolated outputs, each of said stages comprising a voltage divider having the series combination of a first resistor, a diode, a PNPN diode and a second resistor, coupling means including a capacitor for coupling a potential point comprising the junction between said first resistor and said diode on the voltage divider of each stage to another potential point comprising the junction between said diode and one side of said PNPN diode on the voltage divider of the next following stage, said coupling means providing a priming path whereby any one of said bistable devices in an "on" condition primes the bistable device in the next following stage, said coupling means including another potential point on each of said voltage dividers for providing output voltages which form said time frame pulses, and means comprising said bistable device for isolating the ring counter output voltages from circuit transients.

12. The electronic telephone system of claim 11 wherein said electronic device comprises a PNPN diode.

13. The telephone system of claim 11, there being three ring counter channels, means including a common source of clock pulses for synchronously driving said three channels, means for normally enabling the output of a first of said three channels and inhibiting the output of a second of said three channels, means for continuously comparing the outputs of said first and second channels with the output of the third of said three channels, and means responsive to the detection of a difference by said comparing means for enabling the output of said second channel and inhibiting the output of said first channel.

14. The telephone system of claim 13 and means responsive to the detection of said difference for simultaneously resetting said three ring counter channels to restore said synchronism.

15. In an electronic switching system, the combination comprising means including system logic circuitry for responding to a series of time frame pulses to enable the extension of switch paths through said system, means comprising at least three ring counter channels for providing said time frame pulses, means including a common source of clock pulses for synchronously driving the ring counters in said three channels through their count cycles, means for continuously comparing the outputs of a first and a second of said channels with the output of a third of said channels, means for normally enabling the output of said first of said channels to provide the time frame pulses that said logic circuitry responds to, means for normally inhibiting the output of said second of said channels, means responsive to the detection of a difference between the outputs of said first and third channels by said comparing means for enabling the output of said second channel to provide the time frame pulses that said logic circuitry responds to and means also responsive to said detection of said difference for inhibiting the output of said first channel.

16. The telephone system of claim 15, and means for repeatedly transferring between the enabled outputs of said first and second ring counter channels as long as said difference signal persists.

References Cited by the Examiner

UNITED STATES PATENTS

| | | | |
|---|---|---|---|
| 2,646,534 | 7/53 | Manley | 328—43 X |
| 2,669,390 | 2/54 | Manley | 328—43 X |
| 3,021,450 | 2/62 | Jiu | 307—88.5 X |

OTHER REFERENCES

IBM Technical Disclosure Bulletin, vol 1, No. 6, April 1959, pp. 27–30.

GE Newsletter, vol. 5, No. 3, December 1961, p. 7.

Technical Publication Corp., reprinting of the January 1960 issue of Electrical Manufacturing, pp. 71–78.

ROBERT H. ROSE, *Primary Examiner.*

WILLIAM C. COOPER, *Examiner.*